May 10, 1932.  E. W. WOLFORD  1,857,420
COUPLING DEVICE
Filed Sept. 9, 1930  2 Sheets-Sheet 1
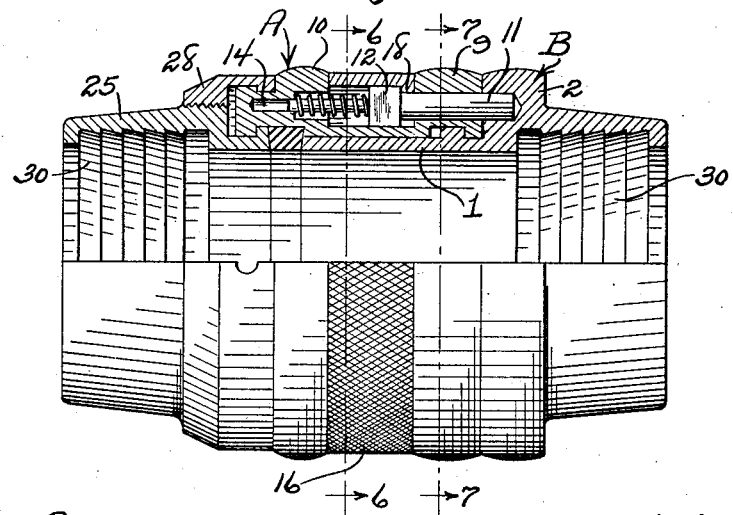
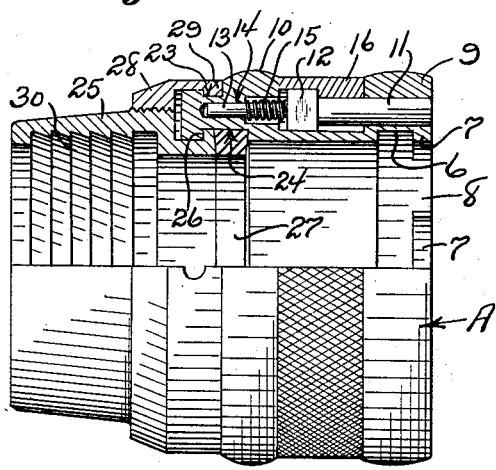
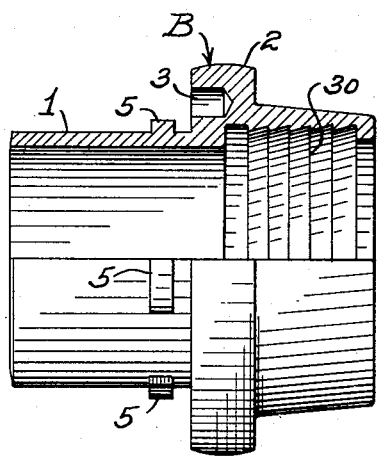
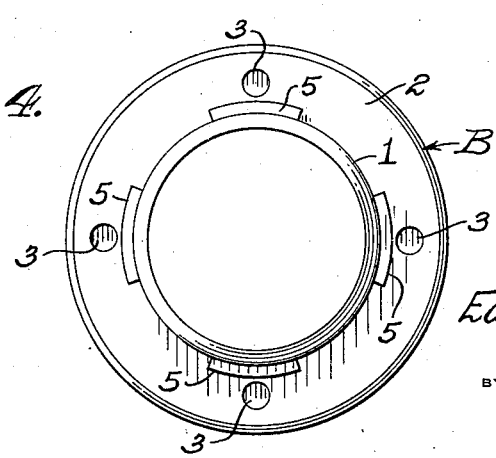
Edgar Warren Wolford
INVENTOR
BY Victor J. Evans
ATTORNEY May 10, 1932. E. W. WOLFORD 1,857,420
COUPLING DEVICE
Filed Sept. 9, 1930 2 Sheets-Sheet 2

Edgar Warren Wolford
INVENTOR
BY Victor J. Evans
ATTORNEY

Patented May 10, 1932

1,857,420

UNITED STATES PATENT OFFICE

EDGAR WARREN WOLFORD, OF SAN JOSE, CALIFORNIA

COUPLING DEVICE

Application filed September 9, 1930. Serial No. 480,737.

This invention relates to a coupling device for coupling together hose, rods or other members, the general object of the invention being to provide a female member and a male member, with means for fastening the members together by a turning movement of one member in relation to the other, with locking means for locking the members against turning movement after they have been connected so that there is no danger of the members becoming disconnected.

A further object of the invention is to provide means for moving the locking means to releasing position so that the members can be separated.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation partly in section, showing the two members connected together.

Figure 2 is an elevation partly in section, of the female member, with the locking pin retracted.

Figure 3 is a view partly in section, of the male member.

Figure 4 is a view looking toward the inner end of the male member.

Figure 5:
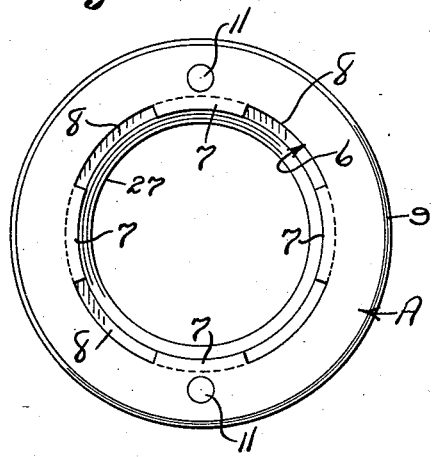
Figure 5 is a view looking toward the inner end of the female member.

In these drawings, the letter A indicates the female member and the letter B the male member. The male member is formed with a cylindrical reduced part 1 for fitting in the female member and with a collar 2 against which the inner end of the female member abuts when the parts are connected together, this collar being formed with the sockets 3 in its inner face. The cylindrical part 1 is provided with the lugs 5 on its outer circumference which are spaced from the collar, as shown.

An internal groove 6 is formed in the female member and is spaced from the inner end thereof so as to leave a wall or flange 7 which is adapted to fit in the space between the lugs 5 and the collar 2 of the male member. This wall or flange is formed with the notches 8 through which the lugs 5 are adapted to pass when the parts are first placed together and then by turning one member, the lugs will engage the flange or wall 7 and thus the two members will be connected together. The female member is formed with the internal collars 9 and 10 which are spaced apart, the collar 9 being flush with the inner end of the female member so that this collar will abut the collar 2 when the members are connected together. Headed locking pins 11 pass through holes in the collar 9 and have their heads 12 arranged in the space between the collars 9 and 10 and a stem 13 is connected with each head and extends into a countersunk hole 14 in the collar 10. A spring 15 is placed on the stem and bears against the head 12 and the bottom of the countersunk portion of the hole and tends to hold the pin in projected position, it being seen that when the pins are projected, they will engage the sockets 3 in the collar 2 of the male member and thus hold the members against relative turning movement. The parts are so positioned that when the male member is placed in the female member and turned to cause the lugs 5 to engage the flange or wall 7, the pins will come into register with the sockets so that the springs will project the pins into the sockets and thus lock the members against turning movement so that they cannot be separated until the pins are retracted.

Figure 6:
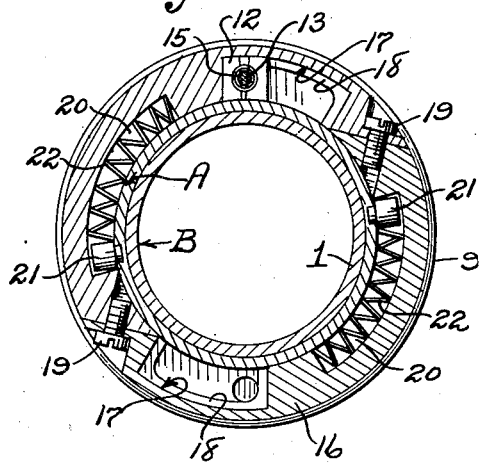
Figure 6 is a section on line 6—6 of Figure 1.
Figure 7:
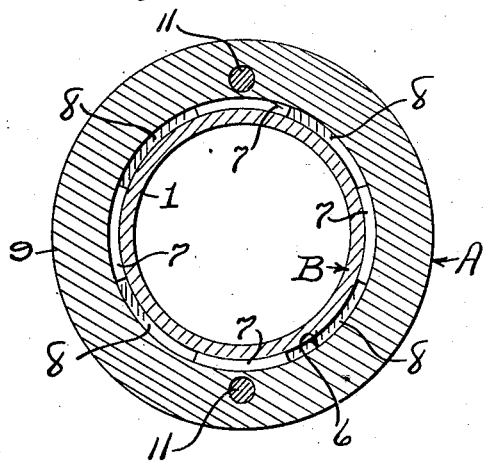
Figure 7 is a section on line 7—7 of Figure 1.
Figure 8:
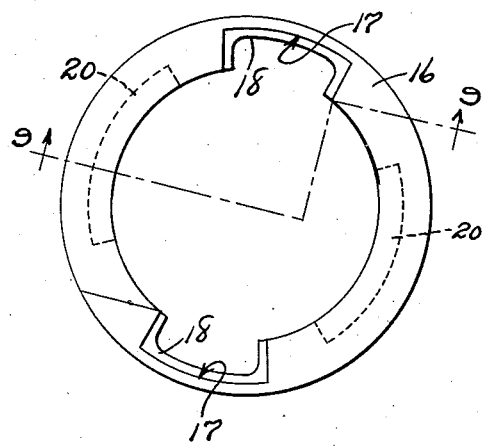
Figure 8 is an end view of the ring for retracting the locking pins.
Figure 9:
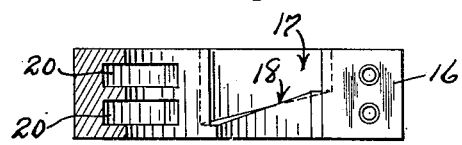
Figure 9 is a section on line 9—9 of Figure 8.

A ring 16 is located in the space between the collars 9 and 10 and has recesses 17 formed in its internal wall to receive the heads of the pins, each recess being so formed as to provide a cam shoulder 18 against which the head of each pin is held by the spring so that by turning the ring, the cam shoulders will retract the pins, as shown in Figure 2. The ring is formed of two sections so that they can be placed in the space between the two collars 9 and 10 and the sections are connected together by the bolts 19. An elongated groove 20 is formed in the internal wall of each section, these grooves receiving the studs 21 carried by the female member and springs 22 are arranged in the grooves and act to hold the ring with each stud at one end of each groove, as shown in Figure 6, the parts being so arranged that the ring is held by the springs 22, with the lower portions of the cams against the heads of the pins so that the springs can project the pins. Thus when the pins are to be retracted, the ring is turned so as to cause the cams to retract the pins and then when the ring is released, the springs 22 return the ring to its normal position where the pins will be projected by their springs.

The outer end of the female member is formed with the external groove 23 and the internal groove 24 and the part 25 of said female member which engages the hose or other member to be coupled to a second member is formed with a flange 26 at its inner end to fit in the groove 24 and a packing ring 27 also fits in said groove and when the male and female members are coupled together, this ring will be compressed between the inner end of the male member and the inner end of the member 25, as shown in Figure 1. Thus leakage between the parts is prevented. When the packing ring wears, such wear can be taken up by moving the member 25 inwardly through means of a ring 28 threaded to the member 25 and having a flange 29 engaging the groove 23 so that by rotating the ring 28, this threaded engagement with the member 25 will cause said member 25 to move inwardly and thus compress the packing ring 27 to compensate for wear of said ring.

The drawings show the member 25 and the outer end of the male member formed with the annular teeth 30 so that the device can be used to connect sections of a hose together, but it will, of course, be understood that when the device is used for connecting other members together, the outer parts of the device would be internally formed to engage the ends of the members which the device couples together.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a female member and a male member, said female member having an internal groove formed with notches in its walls and the male member having lugs thereon passing through the notches when the members are placed together, whereby by turning one member in relation to the other, the lugs will be moved into engagement with the unnotched portions of the walls, locking pins carried by the female member and the male member having keeper recesses therein for receiving the pins whereby turning movement of the members is prevented, a cam ring on the female member for retracting the locking pins, said female member having spaced exterior collars thereon between which the locking ring is rotatably arranged and spring means for holding the locking collar in inoperative position.

In testimony whereof I affix my signature.

EDGAR WARREN WOLFORD.